O. CORADI.
FORMING AND RELIEVING MECHANISM.
APPLICATION FILED APR. 26, 1917.

1,289,674.

Patented Dec. 31, 1918.
3 SHEETS—SHEET 1.

Inventor:
Oswald Coradi,
By
Atty.

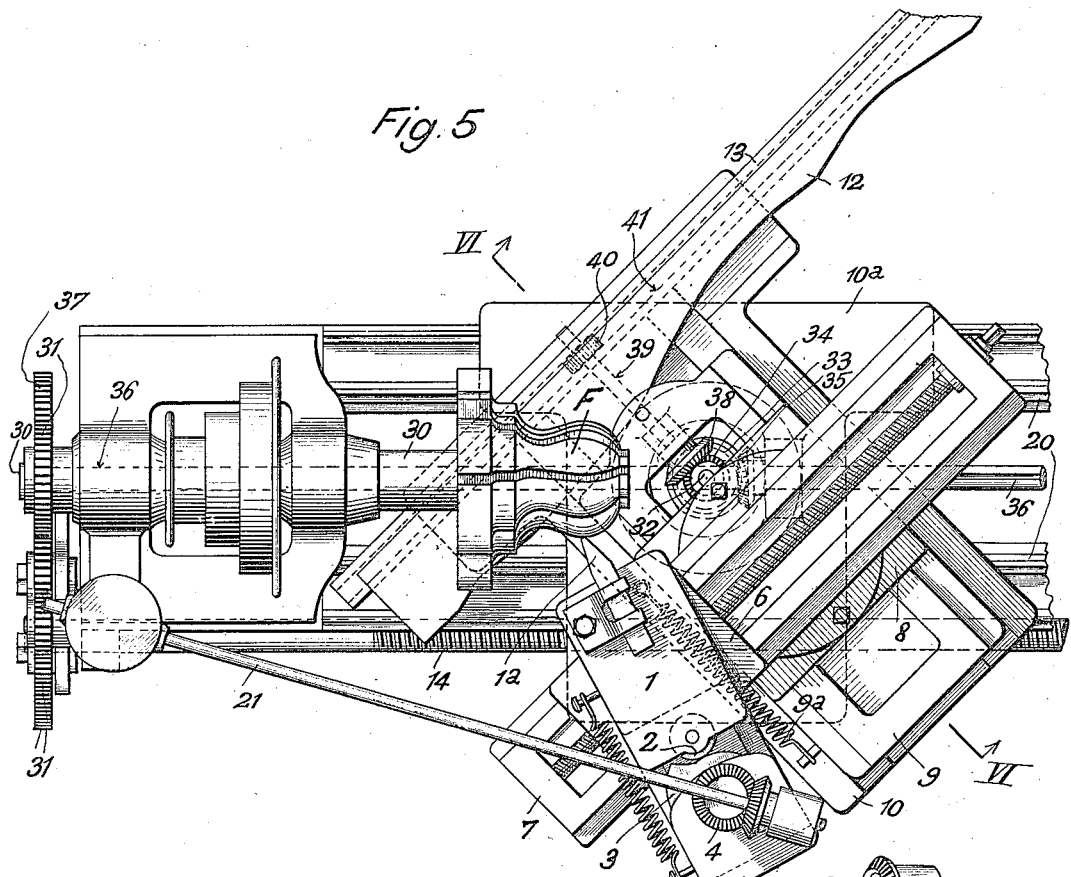

:::::: {.center}
UNITED STATES PATENT OFFICE.
::::::

OSWALD CORADI, OF ZURICH, SWITZERLAND, ASSIGNOR TO HENRI GRAF-BUCHLER, OF ZURICH, SWITZERLAND.

FORMING AND RELIEVING MECHANISM.

1,289,674.  Specification of Letters Patent.  Patented Dec. 31, 1918.

Application filed April 26, 1917. Serial No. 164,783.

*To all whom it may concern:*

Be it known that I, OSWALD CORADI, a citizen of the Republic of Switzerland, residing at Zurich, Switzerland, have invented certain new and useful Improvements in Forming and Relieving Mechanism; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in a universal saddle with copy bar for machine tools adapted to be used for producing backed off or relieved cutting tools of any kind, for instance milling cutters, thread cutting tools and the like.

The universal saddle according to this invention is particularly adapted for the rational manufacture of obliquely relieved profile cutters having helical-shaped cutting teeth by means of a former or copy member having profile-heights which are equal to the corresponding heights of the blank, while its length is greater than that of the blank.

The universal saddle according to this invention comprises a member effecting the relieving movement of the turning tool and operating directly the latter, said member being arranged together with the tool carrier on a revolving compound rest.

The saddle, according to this invention, is also characterized by a movable main slide provided with guides for a movable slide carrying the copy bar and by means effecting a positive operative connection between the means for moving the main slide and the means for moving the slide carrying the copy bar, the arrangement being such, that the slide carrying the copy bar may be moved at a different speed than the main slide. The saddle according to this invention comprises also a rotary compound rest carried by the main slide and acting as a support from the cutting tool.

This invention will now be more particularly described with reference to the accompanying drawings, which illustrate a constructional example of the invention.

In these drawings:

Fig. 5 is a plan view of a second embodiment of the invention, and

Figure 1:
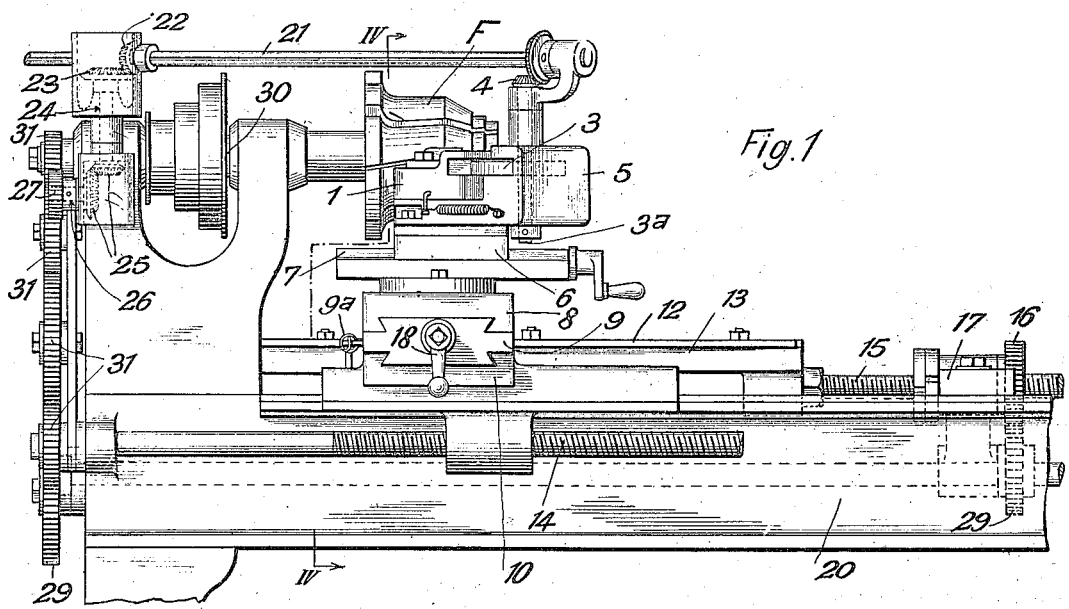
Figure 1 is a front view of a machine tool provided with the improved saddle.
Figure 2:
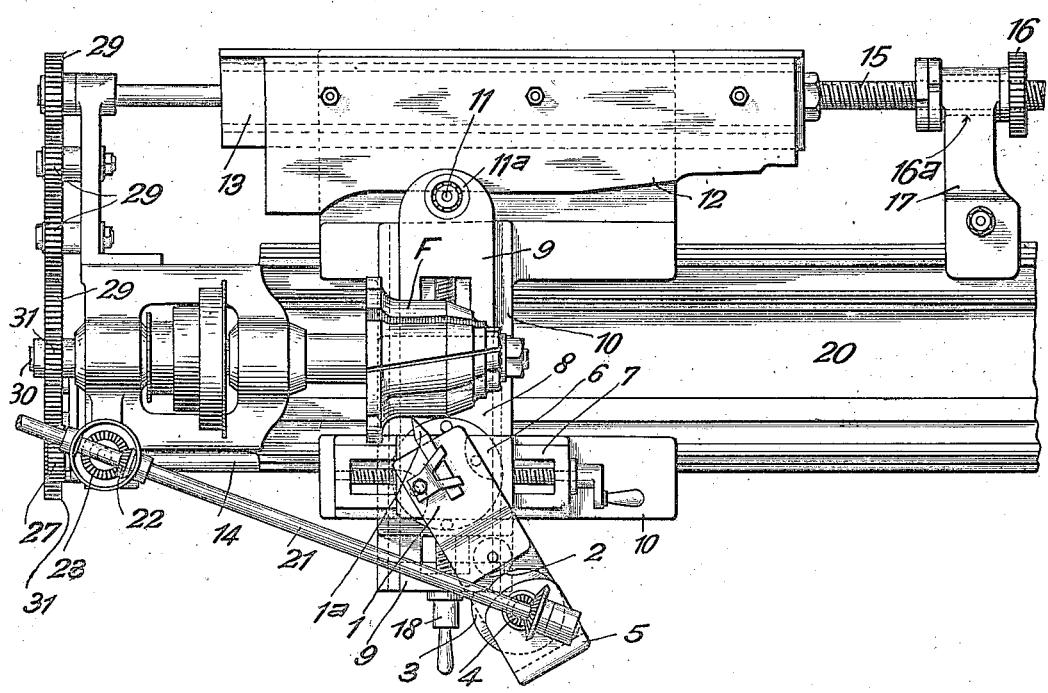
Fig. 2 is a corresponding plan view.
Figure 3:
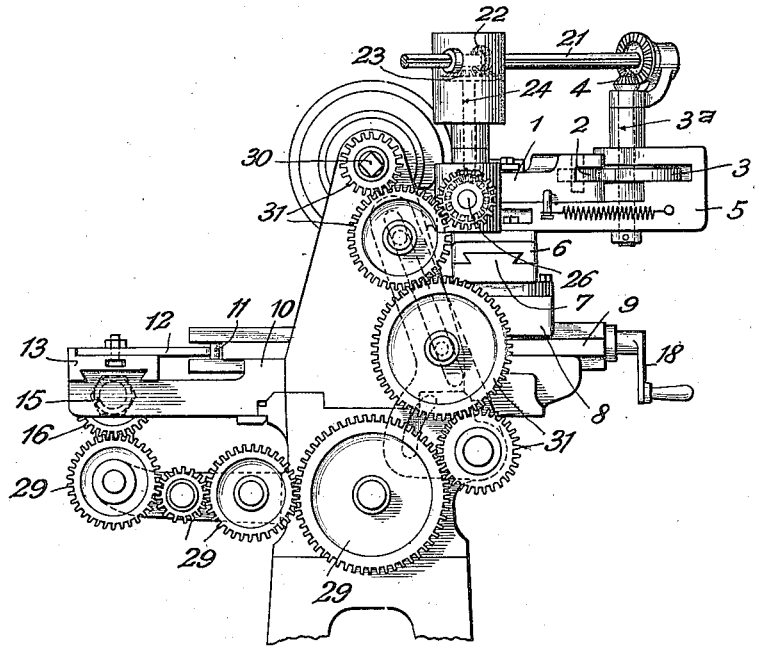
Fig. 3 is a side view.

Fig. 6 a section on the line VI—VI of Fig. 5, it being assumed that the copy bar is brought into a position where it is parallel to the bed of the machine.

1 denotes a holder for the cutting tool 1ª. This holder is adapted to be adjusted in the longitudinal direction of a support 5. A roller 2 mounted on the tool-holder 1 coöperates with a cam 3. The latter is carried by a shaft 3ª mounted in the support 5. The shaft 3ª carries a bevel wheel 4 meshing with a bevel wheel fixed to a shaft 21. The latter carries also a bevel wheel 22. Shaft 21 may be moved in a longitudinal direction relatively to wheel 22, but is prevented from revolving relatively to the latter. Bevel wheel 22 engages with a bevel wheel 23 on a vertical shaft 24 which is operatively connected to an intermediate shaft 26 by means of a pair of bevel wheels 25. Shaft 26 carries also a toothed wheel 27 engaging with a toothed gearing 31. One of the wheels of this gearing 31 is fixed to the lead screw 14 of the machine tool.

The support 5 is adapted to revolve on the top slide 6 of a compound rest 6, 7, 8, 9, the bottom slide 9 of which is adapted to be moved in the longitudinal direction of the main slide 10 and the part 7 of which is capable of rotating on the part 8. Slide 8 of said compound rest is adapted to be moved in the longitudinal direction of the bottom slide 9 by means of a screw and hand crank 18. The main slide 10 which is operatively connected to the lead screw 14 may be moved on the lathe bed 20 in a direction at right angles to the direction of travel of slide 9.

Figure 4:
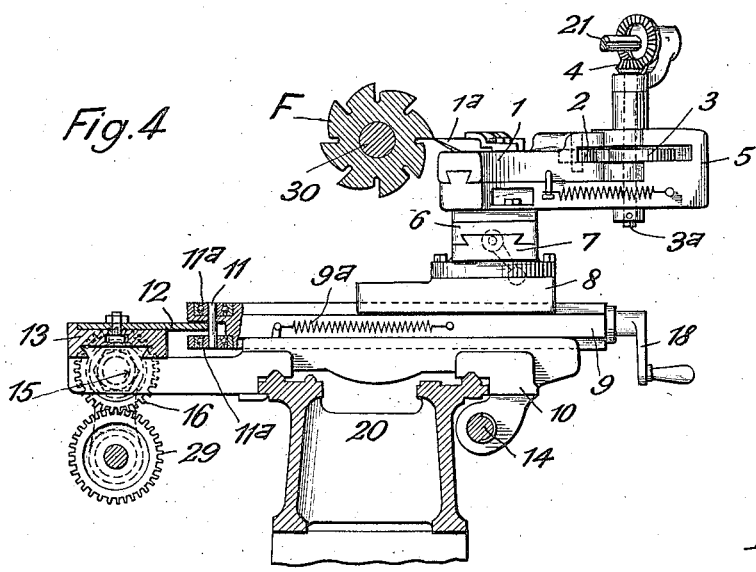
Fig. 4 is a section on the line IV—IV of Fig. 1.

In the embodiment shown the slide 9 is acted upon by a spring 9ª which is connected at one end to the slide 9 and at the other end to the slide 10. This slide 9 coöperates in a manner well known in the art with a copy or former bar 12 by means of a guide finger 11. The latter is mounted in ball bearings 11ª (Fig. 4). The copy bar 12 is mounted on a slide 13 with which is rigidly connected a screw spindle 15. This spindle 15 passes through a nut 16ª provided with a toothed wheel 16. The slide 13 coöperates with an extension of the main slide 10 acting as a guide for said slide 13. The nut 16ᵃ revolves in an arm 17 adapted to be secured to the bed 20 of the machine and it is moved in the proper ratio of gear relatively to the main slide 10 by means of the toothed wheel 16 and a toothed gearing 29, the latter being operatively connected to the lead screw 14. The shape of the copy bar 12 is such, that the heights of its profile are equal to the corresponding heights of the blank, while the length of this copy bar is greater than that of the blank.

The main spindle 30 of the machine tool on which the blank is fixed is also operatively connected to the lead screw 14 by means of the toothed gearing 31.

The method of operation of the device described is as follows:

As soon as the cutting tool 1ᵃ is adjusted in such a manner that it is able to act upon one end of the blank F and when the copy bar 12 has been adjusted in a corresponding manner relatively to the finger 11 by means of an adjustment of the arm 17 on the bed 20, the main spindle 30 may start to transmit its movement to the cutting tool 1ᵃ and the lead screw 14 may start to move the copy bar 12. The main slide 10 is then moved in the longitudinal direction of the bed 20 in accordance with the desired feed, while slide 13 is moved at the same time together with the copy bar 12 in accordance with the ratio of gear of the toothed gearing 29 past finger 11, so that slide 9 is fed in a manner corresponding to the height of the profile. At the same time the cutting tool 1ᵃ backs off on the blank —F— the desired profile in a more or less oblique manner according to the angular position of support 5.

The provision of the guiding means for the slide carrying the copy bar on the saddle of the machine simplifies considerably the whole arrangement as I am not obliged to provide a special guide bed for said slide.

Figs. 5 and 6 show modifications of the invention according to which the main slide 10 is not only slidably mounted on the bed 20, but is also mounted in such a manner on an auxiliary slide 10ᵃ resting on the bed 20 that it is adapted to carry out a revolving movement about vertical shaft 32. The axis of this shaft 32 lies in the vertical plane passing through the axis of the main spindle 30. The shaft 32 is mounted in the auxiliary slide 10ᵃ and it carries two bevel wheels 33 and 34. The bevel wheel 33 meshes with a bevel wheel 35 mounted on a shaft 36 operatively connected to the spindle 30 by means of a toothed wheel 37 and the toothed wheels 31. The bevel wheel 34 meshes with a bevel wheel 38 fixed to a shaft 39 mounted in the main slide 10. The shaft 39 carries also a toothed wheel 40 meshing with a rack 41 provided on the slide 13 carrying the former bar 12. Such a rotary arrangement of the main slide 10 is particularly of great advantage where profiles having large surfaces arranged at right angles have to be relieved. In this case the main slide 10 may be moved into such a position that the direction of movement of the part 9 of the compound rest with regard to the main slide 10 is parallel to the line bisecting the angle inclosed by said surfaces arranged at right angles.

What I claim is:

1. In a forming and relieving mechanism, a tool holder, means carrying the latter comprising a main slide, means adapted to impart a movement to the main slide in a straight line, a copy bar having profile-heights equal to the corresponding heights of the blank while its length corresponds to a multiple of that of the blank, a slide carrying the copy bar mounted directly on the main slide and means for moving the slide carrying the copy bar at any desired velocity with regard to the velocity imparted to the main slide.

2. In a forming and relieving mechanism of the kind described, a main slide, means for moving the latter in a straight line, means for rotating said slide about a vertical axis lying in the vertical plane passing through the longitudinal axis of the spindle carrying the blank, a tool-holder carried by the main slide, a copy member, a slide carrying the copy member, a guide for the latter slide formed integral with the main slide whereby the copy bar is prevented from changing its longitudinal direction relatively to the main slide, means for moving the slide carrying the copy bar, and means effecting a positive operative connection between the means for moving the slide carrying the copy bar and the means for moving the main slide.

3. In a forming and relieving mechanism of the kind described, a main slide, a compound slide rest comprising two slides one of which is rotatably mounted on the other, said rest being movably mounted on the main slide, a tool carrying the slide, a support for the latter slide rotatably mounted on said compound slide rest, means for moving the tool carrying slide relatively to said support, means for moving the main slide, and members effecting a positive operative connection between the means for moving the main slide and the means effecting the movement of the tool carrying slide.

4. In a forming and relieving mechanism of the kind described, the combination with a main slide and means for traversing it; of a profile carrying slide mounted on the main slide and mechanism for traversing said profile slide at any desired multiple of the main slide traverse.

5. In a forming and relieving mechanism, the combination with a rotatable main slide; of a profile carrying slide mounted on the main slide and rotatable in unison therewith, a rotatable work spindle, mechanisms for traversing both slides said mechanisms correlated to the rotatable work spindle, the profile carrying slide being traversed in any desired multiple of the main slide traverse.

6. In a forming and relieving mechanism of the kind described, a main slide, means for moving the latter, a rotary compound slide rest mounted on the main slide, a tool-holder, means adapted to move the latter relatively to the compound rest, a copy bar, a guide-finger mounted in a part of the compound slide rest and adapted to coöperate with the copy bar, a slide carrying the copy bar, a guide for the latter slide formed integral with the main slide whereby the copy bar is prevented from changing its longitudinal direction relatively to the main slide, means for moving the slide carrying the copy bar, and means effecting a positive operative connection between the means for moving the main slide, the means for moving the tool-holder and the means for moving the slide carrying the copy bar.

In testimony that I claim the foregoing as my invention, I have signed my name.

OSWALD CORADI.